United States Patent [19]
Nath et al.

[11] 4,440,558
[45] Apr. 3, 1984

[54] FABRICATION OF OPTICAL PREFORMS BY AXIAL CHEMICAL VAPOR DEPOSITION

[75] Inventors: Dilip K. Nath, Roanoke; Pablo C. Pureza, Burke; Shin M. Oh, Roanoke, all of Va.

[73] Assignee: International Telephone and Telegraph Corporation, New York, N.Y.

[21] Appl. No.: 387,983

[22] Filed: Jun. 14, 1982

[51] Int. Cl.$^3$ .................... C03B 19/06; C03B 37/025
[52] U.S. Cl. ........................................ 65/3.12; 65/13; 65/18.2; 65/32; 65/157
[58] Field of Search ............... 65/3.12, 18.2, 32, 144, 65/157, 13; 427/34, 38, 163, 167; 118/723

[56] References Cited

U.S. PATENT DOCUMENTS

| | | | |
|---|---|---|---|
| Re. 30,883 | 3/1982 | Rau et al. | 65/3.12 X |
| 3,957,474 | 5/1976 | Kobayashi et al. | 65/3.12 |
| 3,966,446 | 6/1976 | Miller | 65/3.12 X |
| 4,017,288 | 4/1977 | French et al. | 65/3.12 X |
| 4,062,665 | 12/1977 | Izawa et al. | 65/3.12 |
| 4,135,901 | 1/1979 | Fujiwara et al. | 65/3.12 X |
| 4,224,046 | 9/1980 | Izawa et al. | 65/3.12 |
| 4,225,330 | 9/1980 | Kakuzen et al. | 65/18.2 |
| 4,230,472 | 10/1980 | Schultz | 65/3.12 |
| 4,242,118 | 12/1980 | Irven | 65/3.12 |

FOREIGN PATENT DOCUMENTS

| | | | |
|---|---|---|---|
| 54-59155 | 5/1979 | Japan | 65/18.2 |
| 54-151625 | 11/1979 | Japan | 65/18.2 |

Primary Examiner—Richard V. Fisher
Attorney, Agent, or Firm—John T. O'Halloran; Peter R. Ruzek

[57] ABSTRACT

Hydroxyl free deposition with high efficiency and at a high deposition rate may be achieved, even with use of relatively inexpensive raw materials, by utilizing a ring-shaped plasma activated axial chemical vapor deposition obtaining 100% chemical conversion and fractional volatilization of impurities. The plasma is induced in an annular stream of a plasma-forming gaseous medium, and the reactant or reactants used in the axial chemical vapor deposition are introduced into the center of the ring-shaped plasma to be converted by the heat of the plasma flame into soot which is deposited on a bait. An annular stream of a cooling medium flows outwardly past the plasma flame and is circumferentially centered by an extension of the outer tubular element of a plasma torch in which the plasma is generated. An RF generator which induces the plasma is operated at a frequency exceeding 20 MHz to give the plasma flame the desired ring-sloped configuration.

24 Claims, 2 Drawing Figures

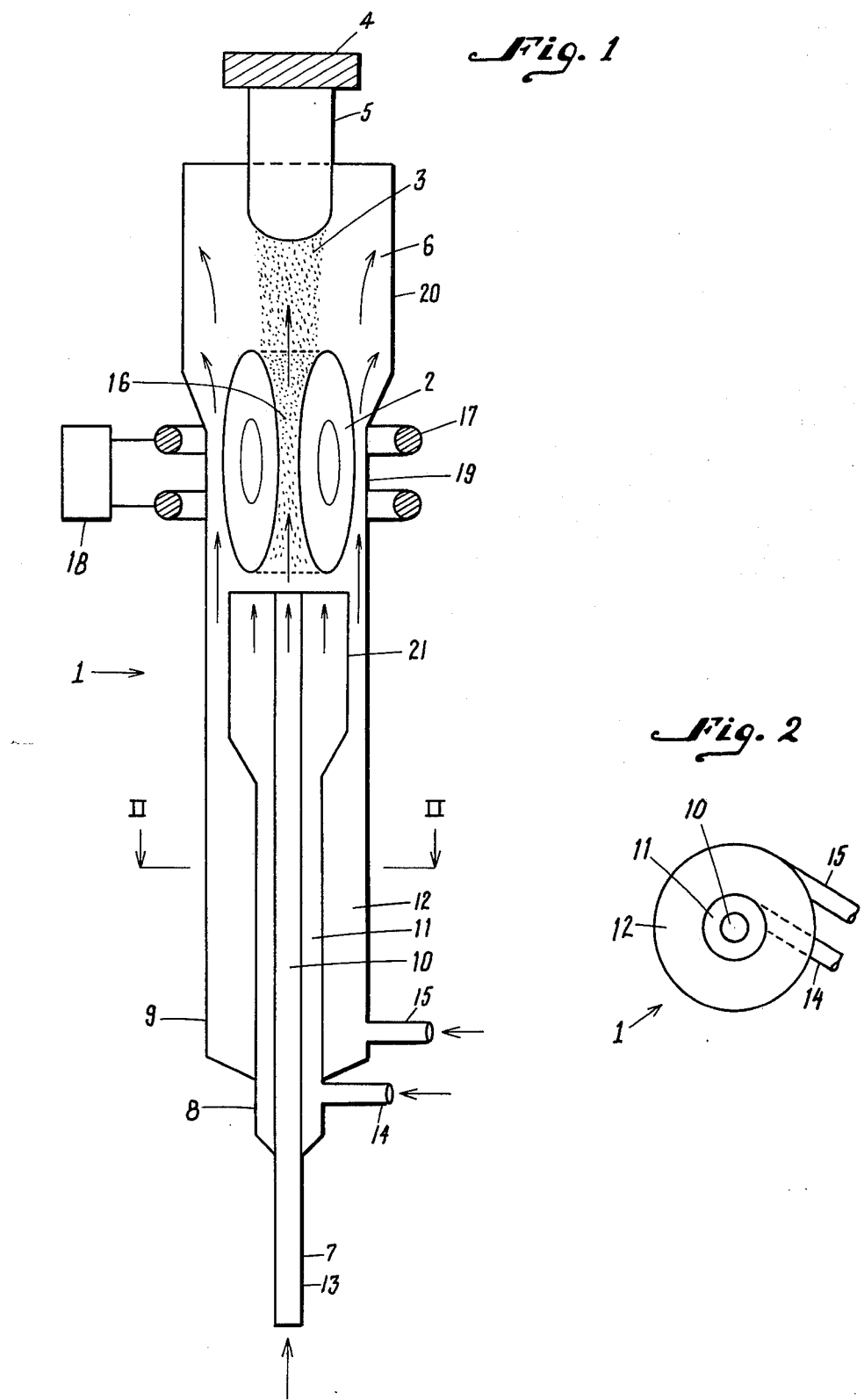

FABRICATION OF OPTICAL PREFORMS BY AXIAL CHEMICAL VAPOR DEPOSITION

BACKGROUND OF THE INVENTION

The present invention relates to an improved process for forming optical preforms for the production of optical fibers, this process being especially suited for making optical preforms which possess stepped index or graded index profiles. Such characteristics render it possible to draw optical fibers exhibiting reliable operating characteristics from such optical preforms.

There has been a continuous search in the prior art for economical and mass production of fiber optic cables for use in optical communications systems.

Thus, the prior art contemplates and describes techniques such as "soot" deposition or hydrolysis wherein a gas vapor mixture is hydrolyzed by a flame to form a glass precursor particulate. The particulate is then deposited on a rotating glass rod serving as a mandrel. The soot is deposited upon the mandrel in a perpendicular direction to provide successive layers of constant radius or to provide preforms with radial gradations by varying the dopant concentration in successive passes of the burner flame. The mandrel is then removed and the thus obtained cylindrical tubular preform is collapsed to a solid rod and then drawn into a fiber. This process is shown and discussed in U.S. Pat. No. 3,826,560 and U.S. Pat. No. 3,823,995. It is also known to use a plasma torch for producing the soot, and to deposit the soot on a boule at a temperature resulting in simultaneous sintering or fusing of the material of the boule, using a solid cross section plasma. This process is known as direct glass deposition. However, experience has shown that the optical properties of the material of the boule produced by the direct glass deposition method and of the optical fiber drawn therefrom are relatively poor, apparently owing to the very high temperature of the soot during its formation and travel toward the boule and the impossibility to control the composition of the boule at various regions thereof, which is caused by random deposition of the soot particles on the boule.

Other techniques as in U.S. Pat. No. 3,614,197 describe processes for continuously forming a fiber optic cable by using a multi-stepped funnel-shaped vessel to form a solid glass rod which is then heated and drawn into a fiber.

In any event, there is a desire to provide a solid optical preform and then draw or process the same into an optical fiber. Both the soot deposition process and the continuous forming approach have inherent benefits in the mass production of such cables.

U.S. Pat. No. 3,966,446 discusses a technique for providing an optical preform. The optical preform is fabricated by the axial deposition from a direction along the preform axis as opposed to radial deposition from a direction perpendicular to the preform axis. The technique does not require a mandrel and thus avoids the need for collapsing a cylindrical preform prior to drawing.

The preforms thus provided in the above noted patent possess longitudinal gradations in the index of refraction and thus serve to enhance certain types of mode conversions.

In any event, there is a need to provide large optical preforms which then can be drawn into elongated optical fiber cables. There is a further need to provide an optical preform which can exhibit stepped single mode or graded index profiles to enable the resultant cable to be used to more efficiently transmit optical information in the form of digital or other signals.

It is known that fiber cables which possess a single mode of operation alleviate mode dispersion problems. It has been a problem to produce reliable cables employing single mode operation in that the prior art techniques could not adequately control the composition of the cable. Thus, many cables employ a multi-mode operation in using radial gradations in the index of refraction. In these cables the difference in velocity from mode to mode compensates for the different path lengths and results in a relatively equal traversal time for all modes.

It is clear that in order to efficiently employ a single mode or a multi-mode operation, one must carefully and accurately control the fabrication of the fiber to assure that the same is consistent in formation and hence, possesses repeatable and reliable operating characteristics.

The fabrication techniques of all optical fiber preforms are broadly based on one fundamental principle, i.e. vapor phase deposition. For example, the reported processes are chemical vapor deposition (CVD), modified chemical vapor deposition (MCVD), outside vapor phase oxidation (OVPO), inside vapor phase oxidation (IVPO), vapor phase axial deposition (VAD) and plasma-activated chemical vapor deposition (PCVD). In all these processes, halides of the preform-forming materials are converted at high temperature to the respective oxide particles and the chemical conversion and deposition processes occur simultaneously.

As advantageous as the conventional application of these methods may be for the production of optical preforms of certain characteristic optical properties, they are either too expensive, too time-consuming or too cumbersome to use commercially, or they are not suited for the production of optical preforms having differentiated optical characteristic properties, and especially for the production of radially graded or stepped index optical preforms.

SUMMARY OF THE INVENTION

Accordingly, it is a general object of the present invention to avoid the disadvantages of the prior art.

More particularly, it is an object of the present invention to develop a method of producing optical preforms, especially such having radially stepped or graded refractive index, which method does not possess the disadvantages of the conventional methods used in the optical fiber manufacturing industry.

Still another object of the present invention is to provide a method of producing optical preforms which renders it possible to avoid contamination of the material of the optical preform by impurities and to give the material of the preform the desired optical properties.

A concomitant object of the present invention is to devise an apparatus which is especially suited for the performance of the method of the present invention.

It is yet another object of the present invention to so construct the apparatus of the type here under consideration as to be able to keep the temperature of the soot at a level at which virtually no contamination of the growing preform occurs and to achieve controlled axial deposition of the soot on a bait.

In pursuance of these objects and others which will become apparent hereafter, one feature of the present invention resides in a method of producing an optical preform, this method comprising the steps of forming a flow of a heated gaseous medium through and beyond a heating zone, including inducing a ring-shaped plasma in the heating zone for heating the gaseous medium to a predetermined temperature; introducing into the heating zone at least one reactant capable of undergoing a chemical conversion into an optical material soot at the predetermined temperature for the soot to be formed in the heating zone, and entrained in the flow of the gaseous medium for travel beyond the heating zone; and disposing a bait in the flow of the gaseous medium beyond the heating zone for depositing the entrained optical material soot on the bait and thus growing the optical preform. This method will be called plasma vapor phase axial deposition.

A particular advantage of this method is that the temperature at the center of the ring-shaped plasma is much lower than that within the plasma itself so that the soot which is formed from the reactant has a much lower temperature than it would have had if the plasma were induced in this central region as well. Thus, when the particles of the soot are deposited on the bait, they will be at a temperature lower than that at which any substantial contamination could occur. In many instances, this temperature will be so low that the soot particles will merely stick to one another without actually melting and fusing with each other on the bait. Under these circumstances, it is further advantages to sinter the optical preform of this consistency prior to the drawing of an optical fiber therefrom.

It is especially advantageous when the forming step includes aiming the flow of the gaseous medium substantially upwardly and when the disposing step includes positioning the bait above the heating zone. When this expedient is resorted to, the gravitational forces and the entraining forces of the gaseous medium will act on the soot particles substantially in opposite directions, so that the soot particles will impact the bait or any particles previously deposited on the bait at a much lower speed than otherwise and also without any component of motion transversely of the bait or of the preform growing thereon, so that the distribution of the deposited particles will be as uniform and coaxial as possible.

The forming step may advantageously include forcing an annual stream of a plasma-forming gaseous medium through the heating zone, and inducing the plasma in the annular stream. In this manner, it is assured that the plasma will acquire and maintain its desired annular configuration. Under these circumstances, it is especially advantageous when the forcing and admitting steps are performed coaxially and concurrently, that is, when the gaseous medium containing the reactant or reactants is introduced into the center of the heating zone separately from the annular stream of the plasma-forming gaseous medium but in the same flow direction as this annular stream. This is advantageous because it will be assured that the stream of gaseous medium carrying the reactant or reactants is indeed introduced into the central region of the heating zone which is surrounded by the plasma and that the merger of these gaseous media will occur without introducing any disturbances or instabilities into the plasma. To further reduce the possibility of destabilizing the plasma by environmental influences, it is further advantageous when the method of the present invention is augmented by the step of confining the flow of the gaseous medium through the heating zone in an annular stream of a shielding gaseous medium flowing past the heating zone. Here again, the shielding gaseous medium will merge with the gaseous medium flowing through the heating zone in a manner which is not conducive of creating instabilities in the annular plasma.

The inducing step is advantageously conducted by subjecting the gaseous medium present in the heating zone to an alternating electromagnetic field at a frequency of at least 20 MHz. At such high frequencies, there is encountered a skin effect which results in the formation of the ring-shaped plasma rather than a plasma extending all the way to the center of the heating zone. Of course, this effect is further enhanced by the above-mentioned passing of the plasma-forming gaseous medium through the heating zone in the annular stream.

Particularly advantageous results are obtained when the introducing step includes admitting halides of glass-forming materials into the heating zone, especially silicon halide or the mixture thereof with a germanium halide. These halides then constitute the reactants which are chemically converted in the heating zone and eventually form the soot particles which are entrained in the flow of the gaseous medium and eventually reach the bait or the growing preform to become deposited thereon. Experience has shown that when germanium halide is added to silicon halide, the resulting silica soot deposited on the bait will be doped with germania in a concentration which varies in the radial direction of the preform. A particular advantage of the method of the present invention is that the resulting optical preform is not contaminated by hydroxyl groups. Other dopants may also be added.

The present invention also relates to an apparatus for producing an optical preform, this apparatus comprising means for forming a flow of a gaseous medium through and beyond a heating zone, including means for inducing a ring-shaped plasma in the heating zone, including heating the gaseous medium to a predetermined temperature; means for introducing into the heating zone at least one reactant capable of undergoing a chemical conversion into an optical material soot at the predetermined temperature for the soot to be formed in the heating zone and entrained in the form of soot in the gaseous medium for travel beyond the heating zone; and means for positioning a bait in the flow of the gaseous medium beyond the heating zone for depositing the entrained optical material soot on the bait and thus growing the optical preform. According to a currently preferred aspect of the present invention, the forming and introducing means include a plasma torch having at least a first elongated tubular element bounding a first flow passage and a second elongated tubular element coaxially surrounding the first tubular element and bounding a second flow passage therewith, the flow passages having downstream ends at and upstream ends remote from the heating zone, means for admitting a plasma-forming gaseous medium and a gaseous medium containing at least the one reactant into the upstream ends respectively of the second and of first flow passages for flow toward the heating zone, and means for subjecting the gaseous medium present in the heating zone to alternating electromagnetic field. Advantageously, the plasma torch has an upright orientation such that the gaseous media issue upwardly out of the respective flow passages, while the positioning means holds the bait above the torch.

In an advantageous construction according to the present invention, the plasma torch further includes a third tubular element coaxially surrounding the second tubular element and bounding a third flow passage therewith which has a downstream end at the heating zone and an upstream end remote from the heating zone, and means for admitting shielding gaseous medium into the upstream end of the third passage for flow therethrough to the downstream end and beyond the same past the heating zone. Thus, the shielding gaseous medium issuing from the third passage protects the ring-shaped plasma present in the heating zone from external influences. However, even a better shielding effect is obtained when the third tubular element has an extension which extends beyond the downstream ends of the flow passages and spacedly surrounds the heating zone. In this case, the shielding gaseous medium will serve to cool the torch and especially the extension of the third tubular element. The extension advantageously has a tubular end portion merging with and having a diameter exceeding that of the remainder of the tubular element, this end portion being situated at the heating zone. In this manner, the cooling gaseous medium will expand into the larger-diameter end portion of the extension, so that its flow speed will be reduced and the dwell time of any unit of volume of this cooling gaseous fluid in the heating zone will be correspondingly increased, and so will the amount of heat accepted and carried away by such a volume unit. Moreover, since the spacing of the enlarged end portion from the plasma is also increased by increasing the diameter of this end portion, the heating effect of the plasma on this end portion is correspondingly reduced. Independently therefrom, or additionally thereto, the second tubular element may have, in accordance with another facet of the present invention, an end portion at the downstream ends of the flow passages which merges with the remainder of the second tubular element and has a diameter exceeding that of such remainder. In this manner, the flow-through cross-sectional area of the downstream end of the second passage is increased and the flow-through cross-sectional area of the third passage is reduced, so that the advancement speed of the plasma-forming gaseous medium into the heating zone is reduced and the speed at which the cooling or shielding gaseous medium is ejected from the downstream end of the third flow passage for flow past the heating zone is increased, resulting in an improved cooling.

Advantageously, the admitting means includes at least one inlet port for each of the passages. Then, it is advantageous when the inlet port for the plasma-forming gaseous medium and/or the inlet port for the shielding gaseous medium is oriented substantially tangentially of the respective upstream end of the associated flow passage. The admitting means may advantageously include means for admitting argon, oxygen or a mixture of argon and oxygen into the upstream end of the second passage, and a gaseous medium containing at least one halide of a glass-forming material into the first passage. The apparatus of the present invention further advantageously includes at least one electrically conductive coil spacedly surrounding the heating zone, and means for passing an alternating current at a frequency of at least 20 MHz through the coil as the subjecting means.

BRIEF DESCRIPTION OF THE DRAWING

FIG. 1 is a diagrammatic longitudinal sectional view through a plasma torch according to the present invention; and FIG. 2 is a cross-sectional view taken on line II—II of FIG. 1.

DETAILED DESCRIPTION OF THE PREFERRED EMBODIMENT

Referring to the drawings, FIG. 1, illustrates a plasma torch 1 wherein a plasma 2 is produced in an inductively coupled oxygen-argon gas. This plasma 2 is generated by the use of a Lepel RF generator (Model No. T-20-3-DF1-TL42) at a frequency of 23 MHz. This results in a very clean high temperature heat source for the deposition especially of a Ge-doped silica soot. The configuration of the plasma flame 2 is annular and is contained in the quartz glass torch 1. The oxidation reactions of the metal halide chemicals such as for instance silicon tetrachloride and germanium tetrachloride with oxygen result in production of very fine particles 3 of Ge-doped silica. These particles are directed toward the bottom surface of a rotating bait 4. The very fine particulate material 3 is entrained in the flow of a gaseous medium to be deposited on the rotating bait 4 so that a boule 5 is formed thereon. As the boule 5 grows as a result of continuing soot deposition, the bait 4 is gradually withdrawn from a deposition chamber 6. The rate of boule growth is equal to the rate at which the bait 4 is withdrawn. In this manner the deposition surface is maintained at a constant distance from the ring-shaped plasma 2. The torch 1 includes an inner tubular element 7, an intermediate tubular element 8 and an outer tubular element 9 which bound respective flow passages 10, 11 and 12. The inner tubular element 7 has an extension 13 through which the respective metal halide chemical enters the flow passage 10 in the axial direction, while the intermediate and outer tubular elements have respective inlet nipples or ports 14 and 15 which, as shown in FIG. 2, extend tangentially of the passages 11 and 12, and through which a plasma-sustaining gas, and a shielding gas, respectively, are introduced into the passages 11 and 12. The outer tubular element 9 at least partially bounds a heating zone 16 in which the annular plasma 2 is formed and causes the metal halide chemical or chemicals entering the heating zone 16 from the flow passage 10 to convert into corresponding metal oxides forming the particles or soot 3. The annular plasma 2 is generated and sustained by a high-frequency electromagnetic field emanating from a coil 17 which is supplied with electric current from an RF generator 18.

The coil 17 surrounds a tubular extension 19 of the outer tubular element 9 which extends beyond the downstream end portions of the inner and intermediate tubular elements 7 and 8. The tubular extension 19 has an end portion 20 of a diameter exceeding that of the remainder of the extension 19 and of the tubular element 9, this end portion 20 radially merging into such a remainder. The enlarged diameter of the end portion 20 results in reduction of speed of the gaseous medium flowing through the chamber 6 and thus an improvement of the cooling action of such a gaseous medium.

Furthermore, the second tubular element 8 is shown to have a similarly configured downstream end portion 21. Because of the increased diameter of the end portion 21 relative to the remainder of the second tubular element 8, the speed of flow of the cooling gaseous medium around the end portion 21 is increased, and the speed of flow of the plasma-forming gaseous medium through the end portion 21 is reduced, so that beneficial flow conditions are obtained at the region of the ring-shaped plasma 2.

In the practice of the invention a deposition rate of 0.4 grams/minute was obtained. Through variations in bait temperature, it was observed that higher bait temperature result in higher deposition rate. The particle size of the Ge-doped silica was on the order of 0.1 $\mu$m. As a result of the temperature gradient along the surface of the boule 5, it was found that the concentration gradient of germanium varied in a radial direction. At the center of the boule 5, the germanium concentration was 16.1 weight percent, while at the edges of the boule 5 the concentration was only 3.4 weight percent. It was additionally observed that a very low OH content existed in the deposited glass (approximately 40 ppm).

The process parameters for the above-described experiment are as follows. The RF generator 18 had a power output equal to 13% of its maximum 20 kilowatts. The grid current was approximately 0.1 amps; plate voltage was approximately 6 kilovolts; plate current was approximately 0.5 amps and the frequency was 23 MHz. In the plasma torch the plasma gases argon and oxygen had flow rates of: argon 0.5 to 1.0 liter/minute at a pressure of 20 p.s.i.; coolant gases: argon 12.0 to 17.0 liters/minute at a pressure of 20 p.s.i., and oxygen 5.0 to 10.0 liters/minute at a pressure of 25 p.s.i. The chemical carrier, silicon tetrachloride, had a flow rate of 0.6 liters/minute at 40 p.s.i., while the germanium tetrachloride had a flow rate of 0.3 liters/minute at a pressure of 40 p.s.i.

The tubular elements 7, 8, 9 had the following dimensions: the first tubular element 7 had an outer diameter of 7 mm, the second tubular element 8 had an outer diameter of 11 mm, its end portion 21 had an outer diameter of 16 mm, the third tubular element 9 had an outer diameter of 20 mm, and its end portion 20 had an outer diameter of 29 mm. The wall thickness of the tubular element 7 was 2.5 mm, while the wall thickness of the tubular elements 8 and 9 was 1.5 mm. The inlet ports 14 and 15 had an outer diameter of 4.0 mm and a wall thickness of 1.0 mm.

Since the plasma flame configuration of the plasma torch 1 can be tailored by taking advantage of the "skin-depth effect" in induction heating, the plasma generated at higher frequencies, for instance, greater than 20 MHz, has a ring-shaped doughnut shape. This plasma flame configuration can be further developed by optimizing the flow velocity of gases. Additionally, torch design and the applied volume flow rate will have an impact on the plasma flame configuration, but their impact will be lesser than that of the above-discussed variables.

The above-described process permits deposition of the highly volatile germanium-doped silica glass using an $Ar/O_2$ plasma torch which provides a very clean high temperature heat source. Such a heat source has been found to be desirable in vapor phase axial deposition. Also, a different inert gas may be mixed with the plasma-forming oxygen.

It has been further observed that a wider variety of dopants can be successfully incorporated in the $SiO_2$ soot by the novel invention described herein. These dopants are converted to the desirable form during their passage through the plasma and deposited in an axial manner to generate soot preform which can be sintered to finally draw optical fibers. These dopants can be varied over a wide range of elements e.g. Ti, P, B, F, Zr, Th and similar elements which can be used to vary the refractive index of $SiO_2$ for the fabrication of optical fiber.

While we have described above the principles of our invention in connection with specific apparatus, it is to be clearly understood that this description is made only by way of example and not as a limitation to the scope of our invention as set forth in the accompanying claims.

We claim:

1. A method of producing an optical preform, comprising the steps of forming a flow of a heated gaseous medium through and beyond a heating zone, including inducing a ring-shaped plasma in the heating zone for heating the gaseous medium to a predetermined temperature;

introducing only into the center of the ring-shaped plasma at least one reactant capable of undergoing a chemical conversion into an optical material soot at the predetermined temperature for the soot to be formed in, and entrained in the flow of the gaseous medium for travel beyond, the heating zone; and disposing a bait in the flow of the gaseous medium beyond the heating zone for depositing the entrained optical material soot on the bait and thus growing the optical preform.

2. The method as defined in claim 1, and further comprising the step of sintering the material of the optical preform.

3. The method as defined in claim 1, wherein said forming step includes aiming the flow of the gaseous medium substantially upwardly; and wherein said disposing step includes positioning the bait above the heating zone.

4. The method as defined in claim 1, wherein said forming step includes forcing an annular stream of a plasma-forming gaseous medium through the heating zone, and inducing the plasma in the annular stream.

5. The method as defined in claim 4, wherein said introducing step includes admitting a stream of gaseous medium containing at least the one reactant into the center of the heating zone separately from the annular stream.

6. The method as defined in claim 5, wherein said forcing and admitting steps are performed coaxially and concurrently.

7. The method as defined in claim 1, and further comprising the step of confining the flow of the gaseous medium through the heating zone in an annular stream of a shielding gaseous medium flowing past the heating zone.

8. The method as defined in claim 1, wherein said inducing step includes subjection the gaseous medium present in the heating zone to an alternating electromagnetic field af a frequency of at least 20 MHz.

9. The method as defined in claim 1, wherein said introducing step includes admitting halides of glass-forming materials into the heating zone.

10. The method as defined in claim 9, wherein said halides are silicon halide and germanium halide.

11. The method as defined in claim 10, wherein said introducing step further includes supplying at least one additional dopant material into the heating zone.

12. The method as defined in claim 11, wherein said additional dopant material is a gaseous compound.

13. The method as defined in claim 11, wherein said additional dopant material is a member selected from a group consisting of phosphorus, boron, fluorine, titanium, zirconium and thorium compounds.

14. An apparatuus for producing an optical preform, comprising
   means for forming a flow of a heated gaseous medium through and beyond a heating zone, including means for inducing a ring-shaped plasma in the heating zone for heating the gaseous medium to a predetermined temperature;
   means for introducing only into the center of the ring-shaped plasma at least one reactant capable of undergoing a chemical conversion into an optical material soot at the predetermined temperature for the soot to be formed in, and entrained in the flow of the gaseous medium for travel beyond, the heating zone; and
   means for positioning a bait in the flow of the gaseous medium beyond the heating zone for depositing the entrained optical material soot on the bait and thus growing the optical preform.

15. The apparatus as defined in claim 14, wherein said forming and introducing means includes a plasma torch having at least a first elongated tubular element bounding a first flow passage and a second elongated tubular element coaxially surrounding said first tubular element and bounding a second flow passage therewith, said flow passages having downstream ends at and upstream ends remote from the heating zone, means for admitting a plasma-forming aqueous medium and a gaseous medium containing at least the one reactant into said upstream ends respectively of said second and said first flow passage for flow toward the heating zone, and means for subjecting the gaseous medium present in the heating zone to alternating electromagnetic field.

16. The apparatus as defined in claim 15, wherein said plasma torch has an upright orientation such that said gaseous media issue upwardly out of the respective flow passages; and wherein said positioning means holds the bait above said torch.

17. The apparatus as defined in claim 15, wherein said plasma torch further includes a third tubular element coaxially surrounding said second tubular element and bounding a third flow passage therewith which has a downstream end at and an upstream end remote from the heating zone, and means for admitting a shielding gaseous medium into the upstream end of said third flow passage for flow therethrough to said downstream end and beyond the same past the heating zone.

18. The apparatus as defined in claim 17, wherein said third tubular element has an extension which extends beyond said downstream ends and spacedly surrounds said heating zone.

19. The apparatus as defined in claim 18 wherein said extension has a tubular end portion merging with and having a diameter exceeding that of the remainder of said third tubular element, said end portion being situated at the heating zone.

20. The apparatus as defined in claim 17, wherein said second tubular element has an end portion at said downstream ends of said flow passages which merges with and has a diameter exceeding that of the remainder of said second tubular element.

21. The apparatus as defined in claim 15, wherein said admitting means includes at least one inlet port for each of the passages.

22. The apparatus as defined in claim 21, wherein said inlet port is oriented substantially tangentially of the respective upstream end of the associated flow passage.

23. The apparatus as defined in claim 15, wherein said admitting means includes means for admitting argon, oxygen, or a mixture thereof into said upstream end of said second passage, and a gaseous medium containing at least one halide of a glass forming material into said first passage.

24. The apparatus as defined in claim 15, wherein said subjecting means includes at least one electrically conductive coil spacedly surrounding the heating zone, and means for passing an alternating current at a frequency of at least 20 MHz through said coil.

* * * * *